W. G. MURRAY.
NON-SKIDDING DEVICE.
APPLICATION FILED FEB. 7, 1913.
1,076,904.
Patented Oct. 28, 1913.
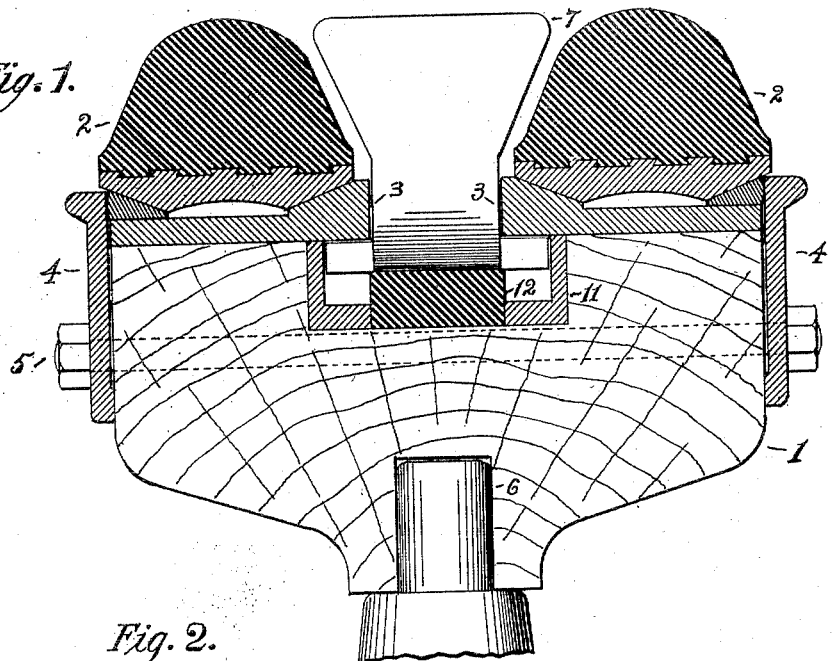
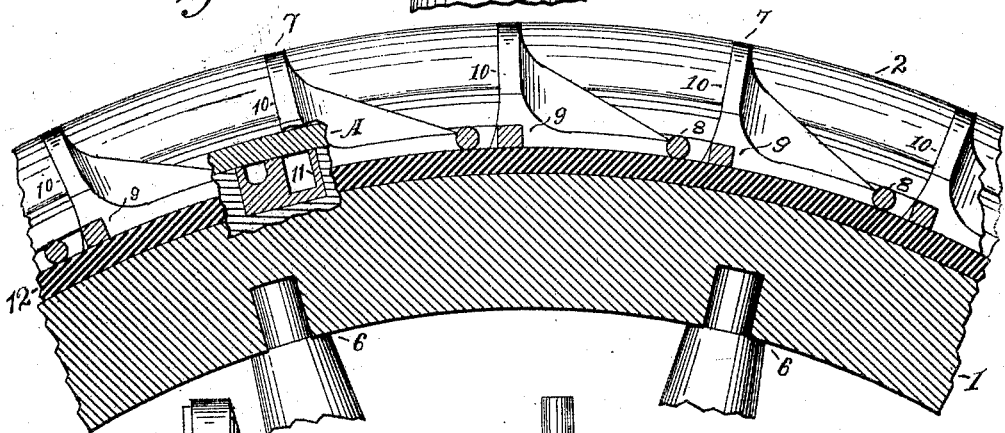
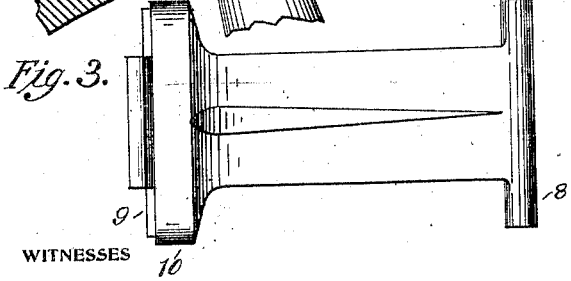
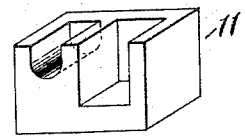
WITNESSES
E. S. Lemme
Curtis Benton
INVENTOR
Willie Grant Murray
BY M. R. Seely
ATTORNEY

UNITED STATES PATENT OFFICE.

WILLIS GRANT MURRAY, OF SAN FRANCISCO, CALIFORNIA.

NON-SKIDDING DEVICE.

1,076,904.

Specification of Letters Patent.   Patented Oct. 28, 1913.

Application filed February 7, 1913. Serial No. 746,843.

*To all whom it may concern:*

Be it known that I, WILLIS GRANT MURRAY, a citizen of the United States, residing in the city and county of San Francisco, State of California, have invented certain new and useful Improvements in Non-Skidding Devices, of which the following is a specification.

This invention relates to rubber-tired wheels equipped with auxiliary non-skidding devices, and its object is to render such devices effective and durable under all conditions of use.

I have observed that the tendency to side-slipping or skidding is initiated by a failure of circumferential or longitudinal traction between the wheels and the road surface, as evidenced, for example, by the well-known fact that the wheels of an automobile to which the motive and braking power is applied have a greater tendency to skid than the wheels which are not connected with the motor or equipped with brakes. Acting on this observation, I have conceived that the proper remedy lies primarily in increasing the longitudinal tractive power rather than in attempting to impose lateral resistance to the slipping tendency, although the same devices which perform the former function may incidentally be capable of resisting a pure side-skid unaccompanied by forward motion. My invention therefore is primarily a means, auxiliary to the rubber tire, for improving the traction of the wheel in a circumferental or longitudinal direction. I have furthermore found it essential to so devise and arrange my non-skidding grips that they will be brought into action by the compression of the rubber tire, will possess rigidity in a circumferential direction while yielding automatically under the weight of the load, and will effectively grip the road surface without binding or cramping under any conditions.

For a clear comprehension of my invention reference should be had to the accompanying drawings, in which:—

Figure 1, is a view in cross-section of a felly with twin tires mounted. In the center is a view in elevation of the metallic grip with the retaining lugs in the pocket bushing. Fig. 2, is a view of the felly in cross-section with one tire in elevation. The grips are in side elevation showing the rib to strengthen the blade, the trunnions for anchoring the grips, and the retaining lugs. This view also shows the metallic pocket bushing in the small broken section, at A. Fig. 3, is a plan view of the grip. Fig. 4, is a view of the metallic pocket bushing.

The numeral 1, is used to designate the felly of a wheel with the twin tires 2, 2, mounted thereon.

3, 3, are the felly bands, and 4, 4, are the cheek plates for securing the tires in place. 5, is a felly bolt, and 6, is the spoke tenon. 7, is the grip with its trunnions 8, 8, and retaining lugs 9, 9. The blade of the grip is indicated by the numeral 10, and the metallic bushings for anchoring the same are shown at 11, while 12, is the rubber cushion.

The operation of my invention is as follows:—The felly of the wheel is channeled and in the sides of the same are inserted the metallic pocket bushings at equal distances apart. The rubber cushion is then placed in the channel and one of the felly bands is pressed into place. The grips are then assembled around the felly, the trunnion entering one hole of the bushing and the retaining lug in the slot of the next bushing being held in place by the felly band covering the openings of the bushings. When the grips are all properly assembled in the manner described, the other felly band is pressed into place and the wheel is ready for the tires. These may be of any type or pattern desired, as the grips do not touch the tire. It is readily seen that as the tires are compressed under load, the blades of the grips come into contact with the road, and, by means of the rubber cushion, respond resiliently to the compression of the tire on either side. This action of the grips insures a constant metallic contact without injury to the roadway or tire and they are not subjected to excessive wear on a wet or dry road. As the retaining lugs prevent them from projecting above the face of the tires, the wear is necessarily even with that of the tire itself. It is also apparent from the fact that my invention assists in carrying the load and does not allow the tire to slip or skid, that its use will increase the life of the tires as well as being a practical means of preventing accidents and serious damage on wet pavements.

The grips 7, having portions which extend circumferentially and other portions which extend radially, or nearly so, of the wheel, may be described as substantially L-shaped and as extending in a general direction circumferentially of the wheel. Their free or acting ends being preferably, as shown, of greater length transversely of the wheel than their length circumferentially, and spaced a substantial distance apart from each other, they are enabled to exert a firm hold upon a hard road surface or to dig into a soft surface and increase the traction. Being substantially flush with, that is, not projecting substantially beyond, the normal surface or periphery of the rubber tire, they operate with very little noise, vibration, or injury to themselves or the road paving.

My invention is to be distinguished from articulated metallic rubber-tire armors and similar structures which constitute a primary or entire tread surface, and from "traction" wheels with either positively-operated or yielding pivoted members forming either a flat tread-surface or one with projections which embed themselves in the roadway. My invention is also distinguished from prior attempts to combine yielding auxiliary grips with rubber tires in that my improved grips are pivoted to turn in the plane of the wheel, extend substantially in a circumferential direction, and exert their tractive effect primarily in that direction, without tending to bind or cramp under any conditions.

Although I have shown twin continuous rubber tires, it will be understood that the rubber tire may be associated with the grips in any suitable manner, and that I do not confine myself to the precise construction of grips or other features shown herein, but may avail myself of any modifications that properly fall within the scope of my invention.

Having thus described my invention, what I claim as new and desire to secure by Letters Patent is:—

1. In a non-skid vehicle wheel, the combination with the felly having a rubber tire, of a series of rigid, yieldingly-supported road grips pivoted to said felly and each extending from its pivot toward its free end in a general direction circumferentially of the wheel, said grips having their road-engaging portions substantially flush with the normal contour or periphery of the tire.

2. In a non-skid vehicle wheel, the combination with the felly having a rubber tire, of a series of rigid yieldingly-supported road grips pivoted to said felly and each extending from its pivot toward its free end in a general direction circumferentially of the tire, their free road-engaging ends being relatively narrow in a circumferential direction and separated from each other by relatively-wide spaces, the structure having means for preventing the projection of said free ends substantially beyond the normal periphery of the tire.

3. In a non-skid vehicle wheel, the combination of a felly formed with a circumferential channel, twin rubber tires located on opposite sides of said channel, a series of substantially L-shaped rigid grips pivotally mounted in said channel and adapted to turn in the plane of the wheel, one arm of each grip extending outwardly to a free end adjacent to the peripheral plane of the tires, and resilient means in said channel supporting said grips.

4. In a non-skid device, the combination of a series of metallic grips, said grips having on one end of their base extending trunnions as a means for movably anchoring the same, on the other end of said base extending retaining lugs as a means for limiting the action of said grips, felly bands so disposed as to retain said grips in position, a means for resiliency operating under said grips, and a means for mounting the tires on either side thereof, substantially as described and claimed.

5. In a non-skid device, a series of movably mounted metallic grips in a channeled felly and encircling the same, extended trunnions and retaining lugs at either end of said grips, metallic pocket bushings inserted in the sides of the channel adapted to receive the trunnions of one grip and provide a slot for the movement of the retaining lugs for the next grip of the series, felly bands adapted to retain the said trunnions and retaining lugs in the pockets of the bushings, an endless rubber band in the channel under the base of said grips as a means of resiliency, and a provision for mounting tires on either side of the resilient grips, substantially as described.

6. A vehicle wheel having a cushion tire and a plurality of annularly arranged substantially L-shaped grips, each having the extremity of one of its arms pivotally connected to the wheel rim and its other arm extending radially outward alongside the tire, and resilient means forming a seat for said grips.

In testimony whereof, I affix my signature in presence of two witnesses.

WILLIS GRANT MURRAY.

Witnesses:
 HORTENSE GARDNER,
 R. C. YOUNG.